(12) United States Patent
Jang et al.

(10) Patent No.: US 9,379,393 B2
(45) Date of Patent: Jun. 28, 2016

(54) CARBON CLADDED COMPOSITE FLOW FIELD PLATE, BIPOLAR PLATE AND FUEL CELL

(75) Inventors: Bor Z. Jang, Centerville, OH (US);
Aruna Zhamu, Centerville, OH (US);
Jiusheng Guo, Centerville, OH (US)

(73) Assignee: Nanotek Instruments, Inc., Dayton, OH (US)

( * ) Notice: Subject to any disclaimer, the term of this patent is extended or adjusted under 35 U.S.C. 154(b) by 1054 days.

(21) Appl. No.: 11/644,122

(22) Filed: Dec. 26, 2006

(65) Prior Publication Data

US 2008/0268318 A1      Oct. 30, 2008

(51) Int. Cl.
*H01M 2/00*      (2006.01)
*H01M 8/02*      (2016.01)
*H01M 8/10*      (2016.01)

(52) U.S. Cl.
CPC .......... *H01M 8/0221* (2013.01); *H01M 8/0206* (2013.01); *H01M 8/0213* (2013.01); *H01M 8/0228* (2013.01); *H01M 8/0267* (2013.01); *H01M 2008/1095* (2013.01); *Y02E 60/50* (2013.01)

(58) Field of Classification Search
CPC   H01M 8/0204;  H01M 8/0213;  H01M 8/0228
USPC .......................................................... 429/12
See application file for complete search history.

(56) References Cited

U.S. PATENT DOCUMENTS

| | | | |
|---|---|---|---|
| 4,579,789 A * | 4/1986 | Fukuda ............... | H01M 8/0297 427/115 |
| 5,300,370 A | 4/1994 | Washington et al. | |
| 5,527,363 A | 6/1996 | Wilkinson et al. | |
| 5,547,782 A * | 8/1996 | Dasgupta et al. .............. | 429/322 |
| 5,885,728 A | 3/1999 | Mercuri et al. | |
| 6,037,073 A | 3/2000 | Besmann et al. | |
| 6,171,720 B1 | 1/2001 | Besmann et al. | |
| 6,248,467 B1 | 6/2001 | Wilson et al. | |
| 6,468,686 B1 * | 10/2002 | Mercuri ................ | C04B 35/536 428/131 |
| 6,881,512 B2 | 4/2005 | Saito et al. | |
| 6,939,638 B2 | 9/2005 | Saito et al. | |
| 7,566,410 B2 * | 7/2009 | Song ...................... | B82Y 30/00 252/500 |

(Continued)

FOREIGN PATENT DOCUMENTS

WO   WO 2006/068051   *   6/2006   .............. H01M 8/02

OTHER PUBLICATIONS

U.S. Appl. No. 11/293,540, filed Dec. 5, 2005, Jang.

(Continued)

*Primary Examiner* — Ula C Ruddock
*Assistant Examiner* — Amanda Barrow

(57) ABSTRACT

The present invention provides a carbon-cladded composite composition for use as a fuel cell flow field plate or bipolar plate. In one preferred embodiment, the composition comprises a core composite layer sandwiched between two clad layers, wherein (a) the clad layer comprises a conductive carbon or graphite material (e.g., carbon nano-tubes, nano-scaled graphene plates, graphitic nano-fibers, and fine graphite particles); (b) the core composite layer comprises a matrix resin and a conductive filler present in a sufficient quantity to render the composite layer electrically conductive with an electrical conductivity no less than 1 S/cm (preferably no less than 100 S/cm); and (c) the composition has a planar outer surface on each clad side having formed therein a fluid flow channel.

12 Claims, 11 Drawing Sheets

(56) References Cited

U.S. PATENT DOCUMENTS

| | | | |
|---|---|---|---|
| 8,518,603 B2* | 8/2013 | Jang | B32B 27/18 252/511 |
| 2002/0164483 A1* | 11/2002 | Mercuri | B23B 18/00 428/408 |
| 2002/0177028 A1* | 11/2002 | Suzuki | H01M 8/0213 429/509 |
| 2002/0182387 A1* | 12/2002 | Mercuri | B23B 9/00 428/212 |
| 2003/0054221 A1* | 3/2003 | Saito et al. | 429/34 |
| 2003/0073573 A1* | 4/2003 | Baker et al. | 502/180 |
| 2003/0162079 A1* | 8/2003 | Ooma | B29C 43/003 429/430 |
| 2004/0127621 A1* | 7/2004 | Drzal et al. | 524/424 |
| 2004/0142638 A1* | 7/2004 | Petroski et al. | 451/41 |
| 2004/0229993 A1 | 11/2004 | Huang et al. | |
| 2005/0031933 A1* | 2/2005 | Blunk et al. | 429/35 |
| 2005/0062024 A1* | 3/2005 | Bessette et al. | 252/500 |
| 2005/0112441 A1* | 5/2005 | Iino et al. | 429/34 |
| 2005/0260482 A1* | 11/2005 | Frank et al. | 429/38 |
| 2005/0277009 A1* | 12/2005 | Mukuda et al. | 429/34 |
| 2005/0287415 A1* | 12/2005 | Hatoh et al. | 429/38 |
| 2006/0084750 A1* | 4/2006 | Huang | C08K 7/02 524/495 |
| 2006/0112646 A1* | 6/2006 | Simmons | 51/295 |
| 2006/0115708 A1* | 6/2006 | Ishii | H01M 8/0215 429/457 |
| 2006/0159979 A1* | 7/2006 | De Vaal et al. | 429/40 |
| 2006/0280882 A1* | 12/2006 | Oka et al. | 428/1.31 |
| 2007/0065703 A1* | 3/2007 | Abd Elhamid et al. | 429/34 |
| 2008/0095994 A1* | 4/2008 | Jiang et al. | 428/212 |
| 2009/0081361 A1* | 3/2009 | Yamada et al. | 427/162 |

OTHER PUBLICATIONS

U.S. Appl. No. 11/293,541, filed Dec. 5, 2005, Jang, et al.
U.S. Appl. No. 11/324,370, filed Jan. 4, 2006, jang, et al.

* cited by examiner $\sigma_1, \rho_1, R_1, t_1$ = conductivity, resistivity, resistance and thickness of top or bottom layer
$\sigma_2, \rho_2, R_2, t_2$ = conductivity, resistivity, resistance and thickness of core layer $R_1 = \rho_1 t_1 / A_1$   $A_1 = A_2 = A_s$ $R_2 = \rho_2 t_2 / A_2$ $R_s = 2R_1 + R_2 = (2\rho_1 t_1 + \rho_2 t_2)/A_2 = \rho_s(2t_1 + t_2)/A_s$ $\rho_s = (2\rho_1 t_1 + \rho_2 t_2)/(2t_1 + t_2)$   $\sigma_s = 1/\rho_s$

FIG.8(a) Conductivity of cladded composite versus core layer resistivity.
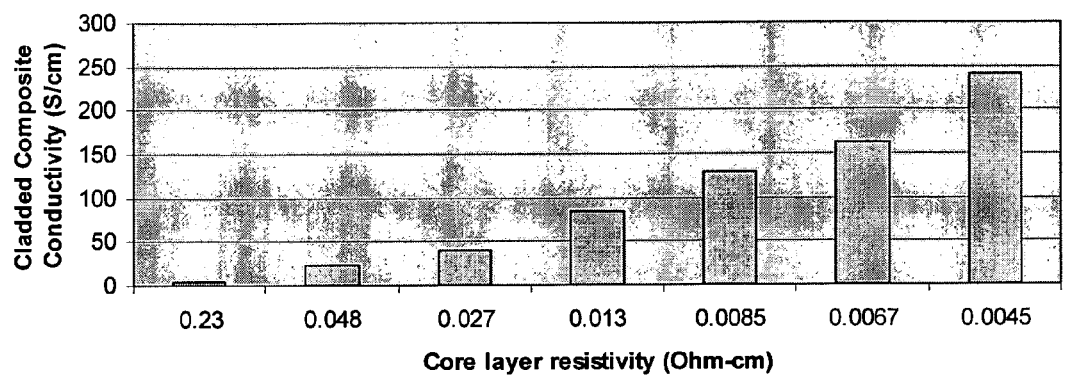
FIG.8(b) Areal conductivity versus core layer resistivity.
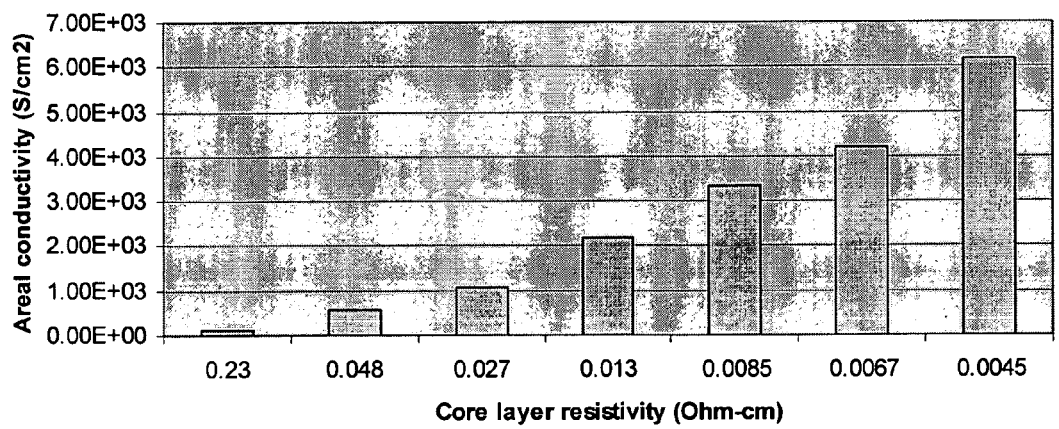

FIG.9(a) Cladded composite conductivity versus clad layer thickness.
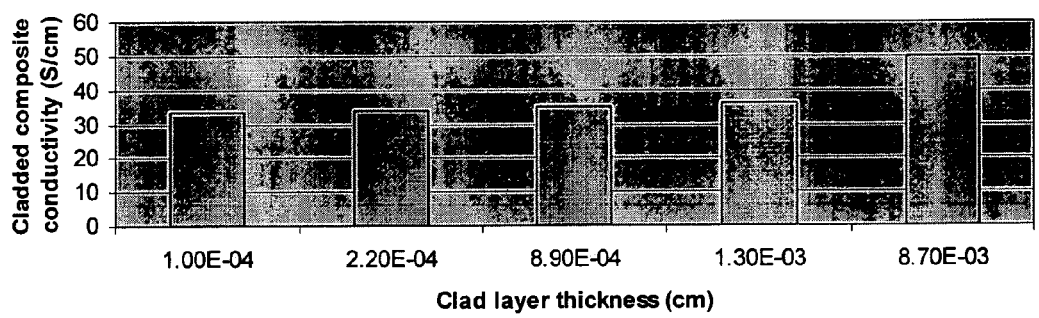
FIG.9(b) Areal conductivity versus clad layer thickness.
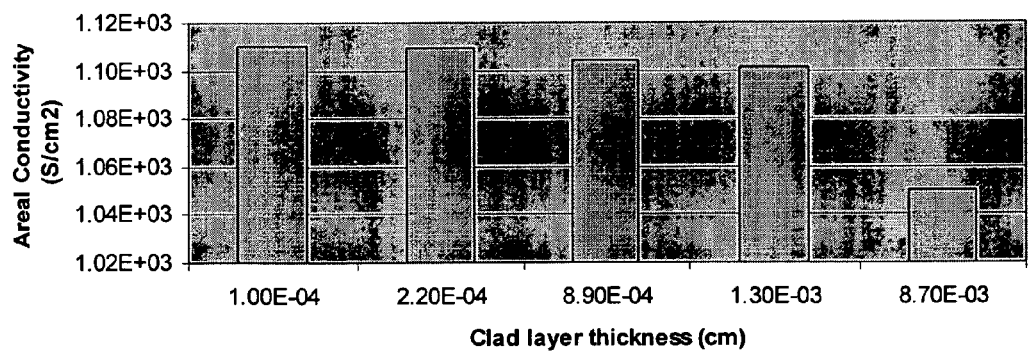

CARBON CLADDED COMPOSITE FLOW FIELD PLATE, BIPOLAR PLATE AND FUEL CELL

The present invention is based on the research results of a project supported by the DOE SBIR Program. The US government has certain rights on this invention.

FIELD OF THE INVENTION

The present invention relates to a carbon-cladded composite (CCC) for use as a fuel cell bipolar plate or flow field plate. In particular, it relates to a highly conductive carbon- or graphite-faced polymer matrix composite structure for use as a flow field plate or bipolar plate in a proton exchange membrane fuel cell.

BACKGROUND OF THE INVENTION

A fuel cell converts chemical energy into electrical energy and some thermal energy by means of a chemical reaction between a fuel (e.g., hydrogen gas or a hydrogen-containing fluid) and an oxidant (e.g., oxygen or air). A proton exchange membrane (PEM) fuel cell uses hydrogen or hydrogen-rich reformed gases as the fuel, a direct-methanol fuel cell (DMFC) uses methanol-water solution as the fuel, and a direct ethanol fuel cell (DEFC) uses ethanol-water solution as the fuel, etc. These types of fuel cells that require utilization of a PEM layer as a proton transport electrolyte are collectively referred to as PEM-type fuel cells.

A PEM-type fuel cell is typically composed of a seven-layered structure, including (a) a central PEM electrolyte layer for proton transport; (b) two electro-catalyst layers on the two opposite primary surfaces of the electrolyte membrane; (c) two fuel or gas diffusion electrodes (GDEs, hereinafter also referred to as diffusers) or backing layers stacked on the corresponding electro-catalyst layers (each GDE comprising porous carbon paper or cloth through which reactants and reaction products diffuse in and out of the cell); and (d) two flow field plates (or a bi-polar plate) stacked on the GDEs. The flow field plates are typically made of graphite, metal, or conducting composite materials, which also serve as current collectors. Gas-guiding channels are defined on a GDE facing a flow field plate or, more typically, on a flow field plate surface facing a GDE. Reactants (e.g., $H_2$ or methanol solution) and reaction products (e.g., $CO_2$ at the anode of a DMFC, and water at the cathode side) are guided to flow into or out of the cell through the flow field plates. The configuration mentioned above forms a basic fuel cell unit. Conventionally, a fuel cell stack comprises a number of basic fuel cell units that are electrically connected in series to provide a desired output voltage. If desired, cooling channels and humidifying plates may be added to assist in the operation of a fuel cell stack.

In one common practice, a fuel flow field plate and an oxidant gas flow field plate are separately made and then assembled together to form a bipolar plate (one side of a bipolar plate serving as a negative terminal and the other side as a positive terminal, hence the name). In some cases, an additional separator is sandwiched between the two flow field plates to form a bipolar plate. It would be highly advantageous if the flow filed plates and the separator can be mass-produced into an integrated bipolar plate assembly. This could significantly reduce the overall fuel cell production costs and reduce contact ohmic losses across constituent plate interfaces. The bipolar plate is known to significantly impact the performance, durability, and cost of a fuel cell system. The bipolar plate, which is typically machined from graphite, is one of the most costly components in a PEM fuel cell.

Fluid flow field plates have open-faced channels formed in one or both opposing major surfaces for distributing reactants to the gas diffuser plates (the anode and cathode backing layers, typically made of carbon paper or fabric). The open-faced channels also provide passages for the removal of reaction products and depleted reactant streams. Optionally, a bipolar plate may have coolant channels to manage the fuel cell temperature. A bipolar plate should have the following desirable characteristics: high electrical conductivity (e.g., preferably having a conductivity no less than 100 S/cm), low permeability to fuel or oxidant fluids, good corrosion resistance, and good structural integrity.

Conventional methods of fabricating fluid flow field plates require the engraving or milling of flow channels into the surface of rigid plates formed of a metal, graphite, or carbon-resin composite. These methods of fabrication place significant restrictions on the minimum achievable fuel cell thickness due to the machining process, plate permeability, and required mechanical properties. Further, such plates are expensive due to high machining costs. The machining of channels into the graphite plate surfaces causes significant tool wear and requires significant processing times.

Alternatively, fluid flow field plates can be made by a lamination process (e.g., U.S. Pat. No. 5,300,370, issued Apr. 5, 1994), wherein an electrically conductive, fluid impermeable separator layer and an electrically conductive stencil layer are consolidated to form one open-faced channel. Presumably, two conductive stencil layers and one separator layer may be laminated to form a bipolar plate. It is often difficult and time-consuming to properly position and align the separator and stencil layers. Die-cutting of stencil layers require a minimum layer thickness, which limits the extent to which fuel cell stack thickness can be reduced. Such laminated fluid flow field assemblies tend to have higher manufacturing costs than integrated plates, due to the number of manufacturing steps associated with forming and consolidating the separate layers. They are also prone to delamination due to poor interfacial adhesion and vastly different coefficients of thermal expansion between a stencil layer (typically a metal) and a separator layer.

A variety of composite bipolar plates have been developed, which are mostly made by compression molding of polymer matrices (thermoplastic or thermoset resins) filled with conductive particles such as graphite powders or fibers. Because most polymers have extremely low electronic conductivity, excessive conductive fillers have to be incorporated, resulting in an extremely high viscosity of the filled polymer melt or liquid resin and, hence, making it very difficult to process. Bi-polar plates for use in PEM fuel cells constructed of graphite powder/fiber filled resin composite materials and having gas flow channels are reviewed by Wilson, et al (U.S. Pat. No. 6,248,467, Jun. 19, 2001). Injection-molded composite-based bipolar plates are disclosed by Saito, et al. (U.S. Pat. No. 6,881,512, Apr. 19, 2005 and U.S. Pat. No. 6,939,638, Sep. 6, 2005). These thermoplastic or thermoset composites exhibit a bulk conductivity significantly lower than 100 S/cm (the US Department of Energy target value), typically not much higher than 10 S/cm. The plates produced tend to be relatively thick.

Besmann, et al. disclosed a carbon/carbon composite-based bipolar plate (U.S. Pat. No. 6,171,720 (Jan. 9, 2001) and U.S. Pat. No. 6,037,073 (Mar. 14, 2000)). The manufacture process consists of multiple steps, including production of a carbon fiber/phenolic resin preform via slurry molding, followed by a compression-molding step. The molded part is then pyrolyzed at a high temperature (1,500° C.-2,500° C.) to obtain a highly porous carbon/carbon composite. This is followed by chemical vapor infiltration (CVI) of a carbon matrix into this porous structure. It is well-known that CVI is a very time-consuming and energy-intensive process and the resulting carbon/carbon composite, although exhibiting a high electrical conductivity, is very expensive.

Instead of using pyrolyzation and CVI to produce carbon/carbon composites, Huang, et al. (US Patent Application Pub. No. 2004/0229993, Nov. 18, 2004) discloses a process to produce a thermoplastic composite with a high graphite loading. First, polymer fibers, such as thermotropic liquid crystalline polymers or polyester, reinforcing fibers such as glass fibers, and graphite particles are combined with water to form a slurry. The slurry is pumped and deposited onto a sieve screen. The sieve screen serves the function of separating the water from the mixture of polymer fibers, glass fibers and graphite. The mixture forms a wet-lay sheet which is placed in an oven. Upon heating to a temperature sufficient to melt the polymer fibers, the wet-lay sheet is allowed to cool and have the polymer material solidify. Upon solidification, the wet-lay sheet takes the form of a sheet material with reinforcement glass fibers held together by globules of thermoplastic material, and graphite particles adhered to the sheet material by the thermoplastic material. Several of these sheets are then stacked, preferably with additional graphite powder interspersed between sheets, and compression-molded in a hot press. After application of heat and pressure in the press, one or more formed bipolar plates are obtained, where the bipolar plates are a composite of glass fibers, thermoplastic matrix and graphite particles. Clearly, this is also a tedious process which is not amenable to mass production.

Alternatively, fluid flow field plates can be made from an electrically conductive, substantially fluid impermeable material that is sufficiently compressible or moldable so as to permit embossing. Flexible graphite sheet is generally suitable for this purpose because it is relatively impervious to typical fuel cell reactants and coolants and thus is capable of isolating the fuel, oxidant, and coolant fluid streams from each other. It is also compressible and embossing processes may be used to form channels in one or both major surfaces. The "flexible graphite" is the exfoliated reaction product of rapidly heated natural graphite particles which have been treated with an agent that intercalates into the crystal structure of the graphite to expand the intercalated particles at least 80 or more times (up to 1000 times) in the direction perpendicular to the carbon layers in the crystal structure. The exfoliated graphite may be compressed together into flexible sheets which, unlike the original graphite flakes, can be formed and cut into various shapes. These thin sheets (foils or films) are hereinafter referred to as flexible graphite. Flexible graphite can be wound up on a drum to form a roll of thin film, just like a roll of thin plastic film or paper.

Although highly conductive, flexible graphite sheets by themselves do not have sufficient stiffness and must be supported by a core layer or impregnated with a resin. For example, U.S. Pat. No. 5,527,363 (Jun. 18, 1996) discloses a fluid flow field plate comprising a metal sheet interposed between two flexible graphite (FG) sheets having flow channels embossed on a major surface thereof. These FG-metal-FG laminates are also subject to the delamination or blistering problem, which could weaken the plate and may make it more fluid permeable. Delamination or blistering can also cause surface defects that may affect the flow channels on the plate. These problems may be difficult to detect during fabrication and may only emerge at a later date. In particular, thermal cycling between frozen and thawed conditions as are likely to be encountered in an automobile application of the fuel cell, often results in delamination between a flexible graphite layer and the metal layer. Alternatively, Mercuri, et al. (U.S. Pat. No. 5,885,728, Mar. 23, 1999) discloses a flexible graphite sheet having embedded fibers extending from its surface into the sheet to increase the resin permeability of the sheet for the preparation of a resin-impregnated flexible graphite bipolar plate. The step of adding ceramic fibers significantly increases the process complexity and cost.

The flow field plate should be constructed from inexpensive starting materials, materials that are easily formed into any plate configuration, preferably using a continuous molding process, and materials that are corrosion resistant in low temperature fuel cells and that do not require further processing such as high temperature pyrolization treatments. Any laminated or multi-layer plate should have adequate bonding between layers to ensure structural integrity and reduced contact resistance (reduced power loss due to joule heating).

In our earlier applications, we provided a sheet molding compound (SMC) composition for use as a fuel cell flow field plate or bipolar plate [Bor Z. Jang, "Sheet Molding Compound Flow Field Plate, Bipolar Plate and Fuel Cell," U.S. patent application Ser. No. 11/293,540 (Dec. 5, 2005) and Bor Z. Jang, A. Zhamu, Lulu Song, "Method for Producing Highly Conductive Sheet Molding Compound, Fuel cell Flow Field Plate, and Bipolar Plate," U.S. patent application Ser. No. 11/293,541 (Dec. 5, 2005)]. This SMC composition comprises a top flexible graphite (FG) sheet, a bottom FG sheet, and a resin mixture sandwiched between the two FG sheets. The resin mixture comprises a thermoset resin and a conductive filler. The flexible graphite sheet has a planar outer surface having formed therein a fluid flow channel. This SMC structure is simple and the production process is fast and continuous. However, commercially available FG sheets can be expensive. Furthermore, a FG sheet tends to have their constituent graphene platelets (exfoliated graphite platelets) being parallel to the FG sheet plane. The graphite crystal is known to have a high electrical conductivity on the basal plane (graphene plane), but not perpendicular to it. As a consequence, the in-plane electrical conductivity of a FG sheet is much greater than its thickness-direction conductivity. Unfortunately, it is the thickness-direction conductivity of a FG-based SMC that is important for a bipolar plate, rather than the in-plane conductivity. It would be highly desirable if the top and bottom graphite sheets have a higher thickness-direction conductivity (e.g., with graphite platelets oriented perpendicular to a bipolar plate plane).

In another earlier invention [Bor Z. Jang, A. Zhamu, and Lulu Song, "Highly Conductive Composites for Fuel Cell Flow Field Plates and Bipolar Plates," U.S. patent application Ser. No. 11/324,370 (Jan. 4, 2006)], we provided an electrically conductive polymer composite as a bipolar plate. The composite is composed of (A) at least 50% by weight of a conductive filler, comprising at least 5% by weight reinforcement fibers, expanded graphite platelets, graphitic nano-fibers, and/or carbon nano-tubes; (B) a thermoplastic matrix at 1 to 49.9% by weight; and (C) a thermoset binder at 0.1 to 10% by weight; wherein the bulk electrical conductivity of the flow field or bipolar plate is at least 100 S/cm. The thermoset binder resin is used to hold the reinforcement elements (platelets, fibers, nano-tubes, etc.) together to form a composite preform. This composite preform that has a thermoplastic matrix material is at a later time molded into a thermoplastic composite. In one preferred embodiment of this invention, we suggested a bipolar plate that comprises such a thermoplastic composite having a skin layer less than 100 µm in thickness wherein the skin layer has a polymer volume fraction less than 20% and a conductive filler greater than 80%. This composite composition provides a high conductivity, which is a highly desirable feature of a bipolar plate. However, such a composite composition (containing at least 50% conductive reinforcements) tends to result in a thick or bulky molded structure and, hence, is not suitable for the fabrication of thin bipolar plates. A high filler proportion also means a high mixture viscosity and can present processing difficulty. The composite is limited to thermoplastic matrix materials and it requires the use of a thermoset binder to hold the filler particles together first prior to a shape molding operation. A simpler chemical formulation that enables simpler, more convenient, and faster processing of bipolar plates (hence, lower costs) is highly desirable.

Accordingly, an object of the present invention is to provide a new and improved fuel cell flow field plate or a bipolar plate that is a well-integrated, non-SMC component and can be made by using a simple, fast and cost-effective process. The process can be automated and adaptable for mass production. In particular, the bipolar plate has a thin, conductive composite core layer cladded between two carbon/graphite coating (clad) layers. The composite core layer provides some excess resin to help hold the carbon/graphite particles in the clad layers together. The clad layers can be very thin; they can be as thin as 1 µm or thinner and typically can be as thick as 20 µm. The resulting fuel cell system is highly conductive and well suitable for use as a current collector. This instant invention represents a significant improvement over and above the prior art bipolar plates, including our own previously invented plates.

SUMMARY OF THE INVENTION

In one preferred embodiment, the present invention provides a carbon-cladded composite composition for use as a fuel cell flow field plate. The composition comprises a first clad coated on or bonded to a first surface of a conductive composite layer, wherein (a) the first clad comprises a conductive carbon or graphite material; (b) the composite layer comprises a resin and a conductive filler present in a sufficient quantity to render said composition electrically conductive with an electrical conductivity preferably no less than 1 S/cm (typically no lee than 10 S/cm, and preferably greater than 100 S/cm); and (c) the carbon-cladded composite has a planar outer surface, on the first clad side, having formed therein a fluid flow channel. Such a two-layer structure can be used as a fuel cell flow-field plate. However, preferably, the carbon-cladded composite composition further comprises a second clad coated on or bonded to a second surface of the conductive composite layer wherein the first clad, the composite layer, and the second clad form a three-layer sandwich structure and the second clad also comprises a conductive carbon or graphite material. The carbon-cladded composite preferably further has a planar outer surface, on the second clad side, having formed therein a fluid flow channel. Such a three-layer structure can be used as a fuel cell bipolar plate with both of the primary, opposing surfaces having flow field channels molded thereon.

The conductive carbon or graphite material preferably comprises particles selected from the group consisting of carbon fibers, carbon nano-tubes, graphitic nano-fibers, nano-scaled graphene plates, carbon blacks, graphite powder, amorphous carbon, chemical vapor deposited carbon, laser-induced carbon, and combinations thereof. Preferably, the conductive carbon or graphite material comprises nano-scaled graphene platelets or expanded graphite platelets that are substantially non-parallel to a planar outer surface of the two-layer or three-layer cladded composite composition. The first clad or second clad preferably has a thickness smaller than 100 µm. The thickness can be as small as 1 µm or thinner. It is possible that this carbon or graphite material clad layer may have a small portion interfacing with the underlying resin-filler composite layer, wherein this small portion (an inter-phase zone) contains the aforementioned carbon/graphite particles that are bonded by a small amount of resin that happens to permeate into this portion. Typically, the average resin content of this inter-phase zone is less than 20% by weight.

The carbon-cladded composite composition preferably has a matrix resin that is a thermoset resin selected from the group consisting of unsaturated polyester resin, vinyl ester, epoxy, phenolic resin, polyimide resin, bismaleimide resin, polyurethane resin, and combinations thereof. However, the composite matrix material can be a thermoplastic, a thermoset, a semi-interpenetrating network, an interpenetrating network, a rubber or elastomer, or a combination thereof.

The conductive filler in the composite may comprise a conductive material selected from the group consisting of carbon fiber, metal fiber, carbon nano-tube (CNT), graphitic nano-fiber (GNF), nano-scaled graphene platelet (NGP), expanded graphite platelet, carbon black (CB), metal particle, graphite powder, and combinations thereof. The conductive material is typically present in an amount of at least about 3% by weight, based on the total weight of the composite layer.

The process for fabricating a carbon cladded composite may begin with mixing a conductive filler with a resin using, for instance, a static mixer or extruder, or via a solution mixing technique. Using a thermosetting resin matrix composite as an example, the matrix resin is thoroughly mixed with a conductive filler (such as a mixture of NGP and CB) to form a thin layer of uncured filler-resin composite (basically a paste) that has two sticky, wet surfaces. Conductive carbon or graphite particles (e.g., NGP, CB, fine graphite powder, GNF, CNT, etc) are then uniformly sprayed over the two primary surfaces of a wet paste layer to form a three-layer, uncured structure. Alternatively, we can produce two double-layer precursor structures (each having an uncured resin-filler mixture cladded with a carbon/graphite layer. The two precursor structures are then joined together with the uncured resin-filler side of one precursor structure being merged with the corresponding uncured resin-filler side of the other precursor structure to form a three-layer structure.

During composite processing, the conductive particles in each clad layer can be slightly pressed against the core filler-resin paste layer using a doctor's blade or a pair of rollers, allowing the particles to partially penetrate into the core layer and/or squeezing some resin out of the core layer to bind with or bond the sprayed-on particles. This operation naturally results in the formation of a three-layer, cladded composite structure, which is then cured with heat and/or radiation. Embossing or matched-mold pressing is carried out before and/or during resin curing to produce the desired flow field channels on the outer surfaces of the cladded composite. The bossing rollers can be the same rollers used to press the conductive particles against the core resin-filler layer. Similarly, the matched-mold pressing operation can act to impress and consolidate the sprayed-on particles with the core layer. For a thermoplastic matrix composite, the sprayed-on carbon/graphite particles can be impressed when the thermoplastic is heated to its softening temperature (near its glass transition temperature, if an amorphous polymer, or its melting temperature, if a semi-crystalline polymer).

The core composite layer comprises a conductive filler present in a sufficient quantity to render the core layer electrically conductive with a bulk conductivity of the filler-resin mixture (after curing) no less than 1 S/cm (preferably no less than 10 S/cm). The resulting three-layer carbon-cladded composite composition (after resin curing or molding) has a conductivity typically above 100 S/cm or an areal conductivity greater than 200 S/cm$^2$; which are US Department of Energy (DOE) target conductivity values for composite bipolar plates intended for use in vehicular fuel cells.

BRIEF DESCRIPTION OF THE DRAWING

FIG. 8: (a) The thickness-direction conductivity and (b) areal conductivity of a series of cladded composite bipolar plates.

FIG. 9: (a) The thickness-direction conductivity and (b) areal conductivity of another series of cladded composite bipolar plates.

DETAILED DESCRIPTION OF THE INVENTION

Figure 1A:
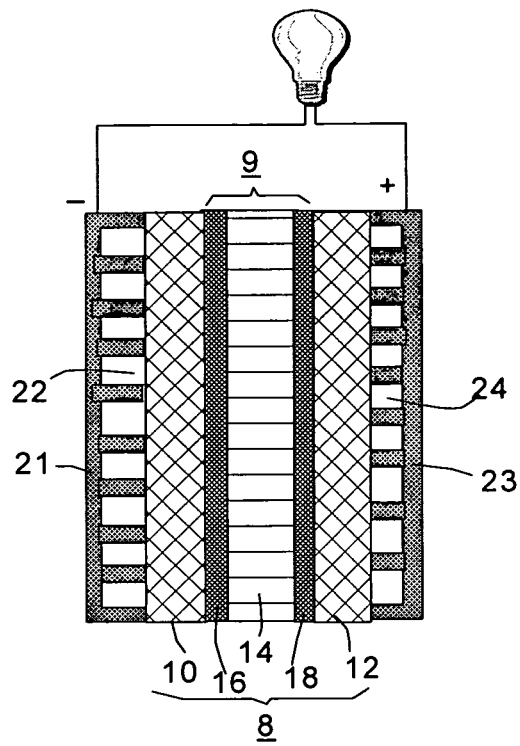
FIG. 1: (A) A sectional view of a prior art PEM fuel cell consisting of a membrane electrode assembly (MEA) sandwiched between two flow field plates 21, 23; (B) A sectional view of a fuel cell stack consisting of two fuel cell units connected in series through a bipolar plate 19.

A prior art fuel cell, as shown in FIG. 1(a), typically comprises a membrane electrode assembly 8, which comprises a proton exchange membrane 14 (PEM), an anode backing layer 10 connected to one face of the PEM 14, and a cathode backing layer 12 connected to the opposite face of PEM 14. Anode backing layer 10 is also referred to as a fluid diffusion layer or diffuser, typically made of carbon paper or carbon cloth. A platinum/ruthenium electro-catalytic film 16 is positioned at the interface between the anode backing layer and PEM 14 for promoting oxidation of the methanol fuel. Similarly, at the cathode side, there are a backing layer or diffuser 12 (e.g., carbon paper or carbon cloth) and a platinum electro-catalytic film 18 positioned at the interface between the cathode backing layer and PEM 14 for promoting reduction of the oxidant.

In practice, the proton exchange membrane in a PEM-based fuel cell is typically coated on both sides with a catalyst (e.g., Pt/Ru or Pt) to form a catalyst-coated membrane 9 (CCM). The CCM layer 9 is then sandwiched between an anode backing layer 10 (diffuser) and a cathode backing layer 12 (diffuser). The resulting five-layer assembly is called a membrane electrode assembly 8 (MEA). Although some fuel cell workers sometimes refer to CCM as a MEA, we prefer to take the MEA to mean a five-layer configuration: anode backing layer, anode catalyst layer, PEM, cathode catalyst layer, and cathode backing layer.

The fuel cell also comprises a pair of fluid distribution plates (also referred to as fluid flow field plates) 21 and 23, which are positioned on opposite sides of membrane electrode assembly 8. Plate 21, which serves as a fuel distribution plate, is shaped to define fuel flow channels 22 facing towards anode diffuser 10. Channels 22 are designed to uniformly deliver the fuel to the diffuser, which transports the fuel to the anode catalyst layer 16. An input port and an output port (not shown), being in fluid communication with channels 22, may also be provided in flow field plate 21 so that carbon dioxide (in a DMFC) can be withdrawn from channels 22.

Figure 1B:
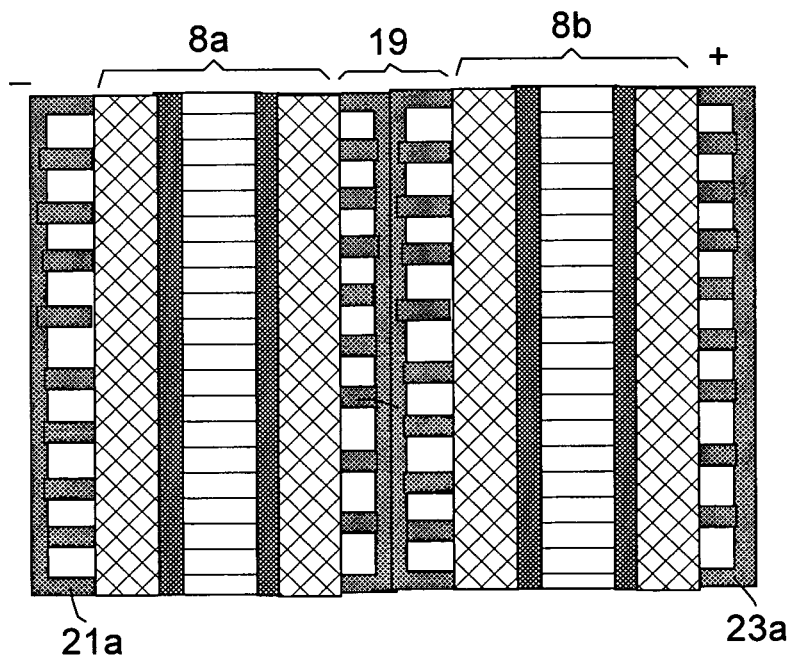

Flow field plate 23 is shaped to include fluid channels 24 for passage of a quantity of gaseous oxygen (or air). An input port and an output port (not shown) are provided in plate 23, which are in fluid communication with channels 24 so that oxygen (or air) can be transported through the input port to the cathode diffuser 12 and cathode catalyst layer 18, and water and excess oxygen (or air) can be withdrawn from channels 24 through the output port. Plate 23 is electrically conductive and in electrical contact with cathode diffuser 12. It can be used as a uni-polar plate (the positive terminal of the electrical current generated by the fuel cell unit) or as a part of a bi-polar plate (if integrated with fuel flow field plate 21). Shown in FIG. 1(b) is a fuel cell stack that consists of two fuel cell units. On the two opposite sides of the stack are two separate flow field plates 21a, 23a. Between the two MEAs (8a and 8b) is a bipolar plate 19, which can be viewed as two flow field plates integrated into one single component.

In the manufacture of fiber reinforced resin composite products, conventional (prior art) sheet molding compounds (SMCs) are frequently used which consist of a mixture of a viscous uncured thermosetting resin and chopped fibers, such as glass fibers. In most cases the resin and chopped fibers are sandwiched between films of plastic material to form a laminated structure which is wound in coiled form. The laminate is stored under conditions which will not result in final curing of the resin. At the time of use, the laminate is uncoiled and cut to the desired size and shape for the molding operation. As the resin which is employed to provide the sheet molding compound is relatively viscous, specific procedures must be employed to provide a thorough impregnation of fibers with the resin. Impregnation can be achieved by passing the laminated structure between cooperating rolls or flexing the laminate in concave and convex shapes. These prior art SMC composites do not have a sufficient electrical conductivity for flow field plate or bipolar plate applications.

Figure 2:
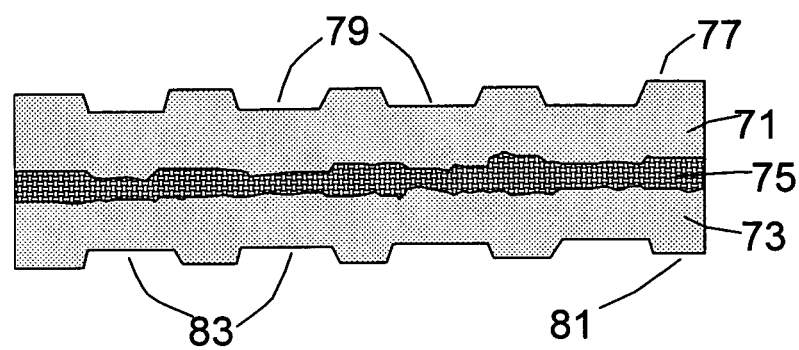
FIG. 2: A sectional view of a bipolar plate consisting of a top flexible graphite layer, a bottom flexible graphite layer, and a core resin-mixture layer.

By contrast, our previous inventions [U.S. application Ser. No. 11/293,540 (Dec. 5, 2005) and U.S. application Ser. No. 11/293,541 (Dec. 5, 2005)] provided a highly conductive sheet molding compound (SMC) composition and a fuel cell flow field plate or bipolar plate made from this SMC composition (FIG. 2). The SMC-based bipolar plate, schematically shown in FIG. 2, comprises a top flexible graphite sheet 71, a bottom flexible graphite sheet 73, and a conductive filler-resin mixture 75 sandwiched between the top sheet and the bottom sheet to form a three-layer SMC. The SMC has a planar outer surface 77 (e.g., near the top sheet 71) having formed therein a fluid flow channel 79 and another outer surface 81 having formed therein another flow field channel 83. The filler-resin mixture 75 comprises a thermoset resin and a conductive filler present in a sufficient quantity to render the SMC composition electrically conductive enough to be a current collector material (with a conductivity of the SMC preferably no less than 100 S/cm). When the resin is cured or solidified, the two sheets 71,73 are well bonded by the resin to provide good structural integrity to the resulting "laminated" structure.

However, as indicated earlier, the in-plane electrical conductivity of a FG sheet is much greater than its thickness-direction conductivity. Hence, the thickness-direction conductivity of a FG-based SMC, which is important for a bipolar plate, is lower than desirable. It would be highly advantageous if the top and bottom graphite layers have a higher thickness-direction conductivity (e.g., with graphite platelets oriented perpendicular to or at least non-parallel to a bipolar plate plane).

Figure 3:
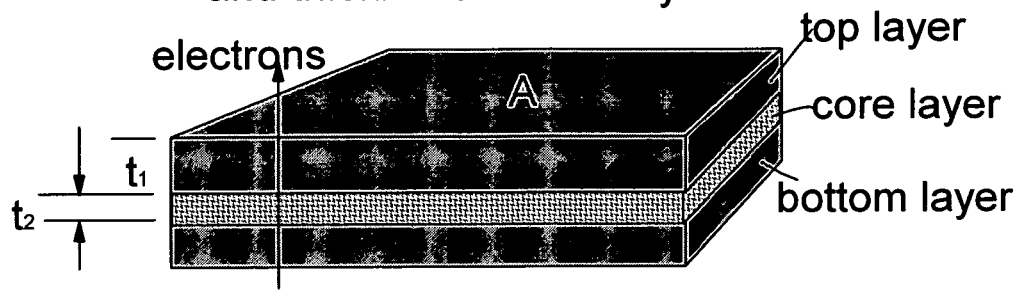
FIG. 3: A three-layer model to simulate the possible structure of a conductive filler-resin composite sandwiched between top and bottom layers that are either resin-rich (low conductivity) or resin-deficient (high carbon content and hence high conductivity).

Another motivation behind the present invention was the recognition by us that a molded conductive filler-resin composite plate tended to have its top and bottom surfaces being coated with a thin layer of resin. This resin-rich or filler-deficient layer has an extremely low electrical conductivity. As a consequence, one often observed a dramatic reduction in electrical conductivity of a molded composite plate that has a resin-rich skin without a graphite/carbon coating. This observation may be understood as follows: A molded composite plate may be viewed as a three-layer structure (FIG. 3) with the skin, core and skin layers electrically connected in series. The total resistance is the sum of the resistance values of the three layers: $R=R_1+R_2+R_3=\rho_1(t_1/A_1)+\rho_2(t_2/A_2)+\rho_3(t_3/A_3)=(1/\sigma_1)(t_1/A_1)+(1/\sigma_2)(t_2/A_2)+(1/\sigma_3)(t_3/A_3)$, where $\rho$=resistivity, $\sigma$=conductivity, t=thickness, and A=area of a layer, and, approximately, $A_1=A_2=A_3$. Scanning electron microscopic examinations reveal that the resin-rich skin layers in composite materials are typically 0.1-10 μm thick. The resistivity of Nylon 6/6 (a thermoplastic) is typically in the range of $10^{12}$-$10^{15}$ ohm-cm and that of epoxy is slightly higher, 1015 or greater. A skin layer, even as thin as 1 nm-0.1 μm could completely dominate the over-all resistivity of the composite bipolar plate. For instance, assume that the top and bottom skin layer (resin only) each has a resistivity $\rho_1=\rho_3=1\times10^{14}$ ohm-cm and thickness of 0.1 μm (100 μm) and the core composite layer has a resistivity $\rho_2=0.01$ ohm-cm, a thickness of 100 μm and a cross-sectional area of 100 cm². Then, the total resistance of the three-layer composite would be $2\times10^7$ ohm and the resistivity would be as high as $2\times10^{11}$ ohm-cm. Even if we assume that the resin-rich skin is as thin as 1 nm, the total composite resistance would still be $2\times10^5$ ohm with a resistivity of $2\times10^9$ ohm-cm. Such a composite structure would not be a good bipolar plate.

In contrast, the resistivity of graphite powder, expanded graphite platelets, carbon nano-tubes, and graphitic nano-fibers is typically in the range of $10^5$-$10^{-3}$ ohm-cm. Assume that the top and bottom skin layer (graphite only or carbon-rich) each has a resistivity $\rho_1=\rho_3=1\times10^{-3}$ ohm-cm and thickness of 1 μm and the core composite layer has a resistivity $\rho_2=0.01$ ohm-cm, a thickness of 100 μm and a cross-sectional area of 100 cm². Then, the total resistance of the three-layer composite would be $1\times10^{-6}$ ohm and the resistivity would be lower than 0.01 ohm-cm (conductivity higher than 100 S/cm, which is a DOE bipolar plate conductivity target value). The areal conductivity (conductivity/thickness) would be as high as 9980 S/cm², much greater than the DOE target of 200 S/cm². It may be noted that the areal conductivity criterion of a bipolar plate is more significant than the absolute bulk, thickness-direction conductivity since the former takes into account the thickness effect. The areal conductivity (conductivity/thickness ratio) of 200 S/cm² contributes to a fuel cell resistance of 0.005 ohm-cm², which is considerably less than the approximately 0.1 ohm-cm² contributions of the other components of a unit fuel cell. This was the rationale behind establishing a target areal conductivity value for a bipolar plate for vehicular fuel cell applications.

Figure 4A:
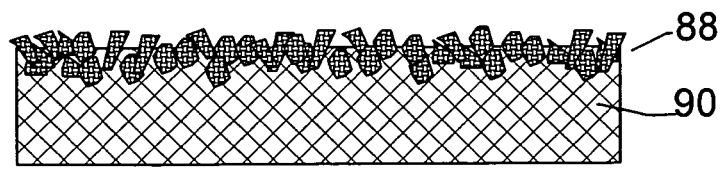
FIG. 4: (a) Schematic of a two-layer structure (a layer 90 of conductive filler-uncured resin mixture surface-cladded or -coated with a layer 88 of carbon/graphite particles), which is a precursor to a highly conductive carbon-cladded composite; (b) Schematic of a uni-polar flow field plate (having flow channels 92) made from the precursor described in (a) via in-line or off-line matched-mold molding or embossing; (c) A three-layer precursor composed of a conductive core filler-resin layer 96 sandwiched between a top layer 98 and a bottom layer 99 of carbon/graphite particles; and (d) A carbon cladded composite bipolar plate comprising a conductive composite core layer 100 cladded with top layer and bottom layer of carbon or graphite material (containing typically 80% to 100% carbon/graphite particles such as carbon nano-tubes, graphitic nano-fibers, nano-scaled graphene plates, carbon black, fine graphite powder, etc.) having flow channels 102 and 104.
Figure 4B:
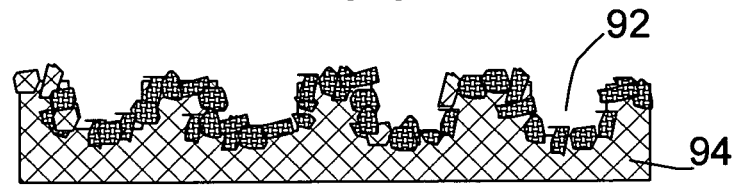

Hence, a preferred embodiment of the present invention is a flow field plate as schematically shown in FIG. 4(b), which can be made from a precursor two-layer material shown in FIG. 4(a). The two-layer structure of FIG. 4(a) consists of a layer 90 of conductive filler-uncured resin mixture that is surface-cladded or -coated with a layer 88 of carbon/graphite particles. These particles can be simply sprayed on to a surface of a composite mixture layer comprising an un-cured matrix resin and a conductive filler phase. The resulting two-layer structure is a precursor to a highly conductive carbon-cladded composite since the sprayed-on particles may be easily impressed in such a manner that they partially penetrate into the resin-filler layer, or a small quantity of uncured resin is slightly squeezed out toward the particle layer to help hold the particles together. Schematically shown in FIG. 4(b) is a uni-polar flow field plate (having flow channels 92) made from the precursor described in FIG. 4(a) via in-line or off-line matched-mold molding or embossing. The top surface is cladded with a thin layer of carbon or graphite material comprising particles such as carbon fibers, carbon nano-tubes, graphitic nano-fibers, nano-scaled graphene plates, carbon blacks, graphite powder, amorphous carbon, chemical vapor deposited carbon, laser-induced carbon, and combinations thereof. The thickness of this clad layer is preferably in the range of 0.1 μm to 10 μm.

Figure 4C:
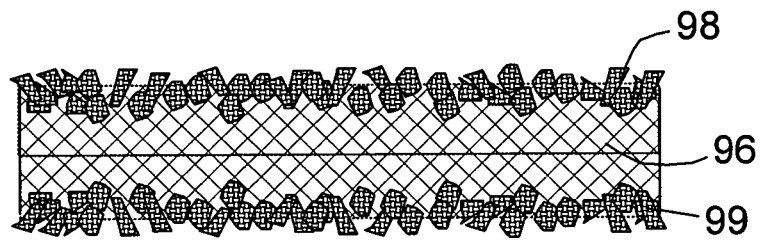
Figure 4D:
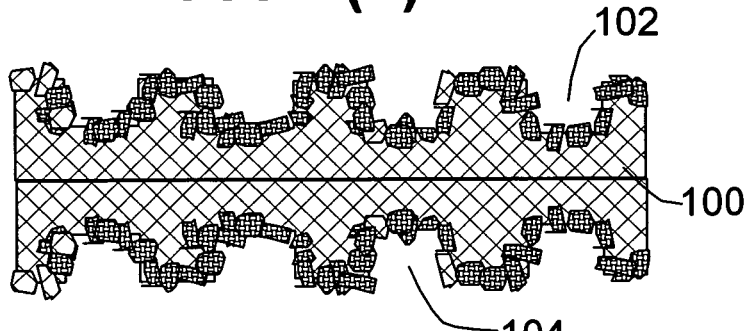
Figure 5A:
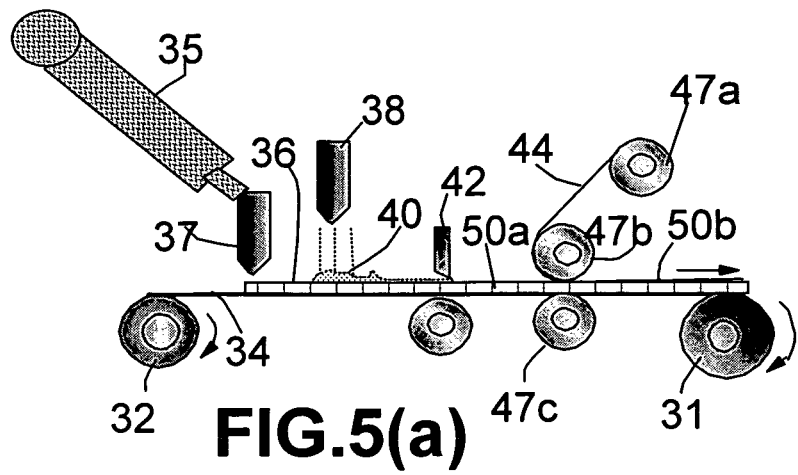
FIG. 5: (a) Schematic of a roll-to-roll process for preparing a roll of a two-layer precursor to a highly conductive carbon-cladded composite; (b) Schematic of another process for fabricating a roll of two-layer precursor composite; (c) Combined composite forming/cladding and in-line embossing or molding of flow field plates; (D) a continuous process for producing bipolar plates from two rolls of precursor composite with the surface flow channels being generated via in-line embossing or matched-mold pressing.
Figure 5B:
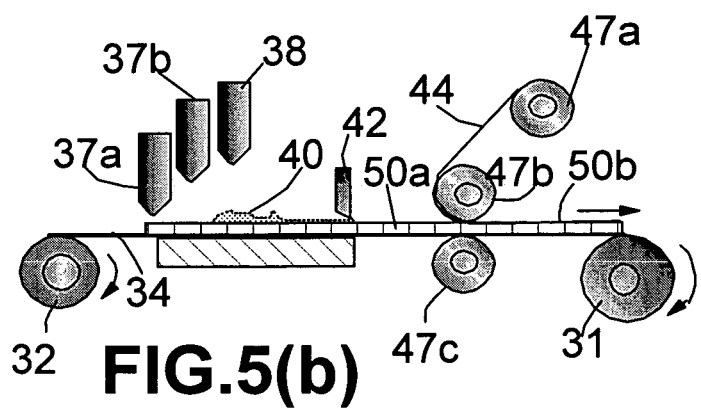
Figure 5C:
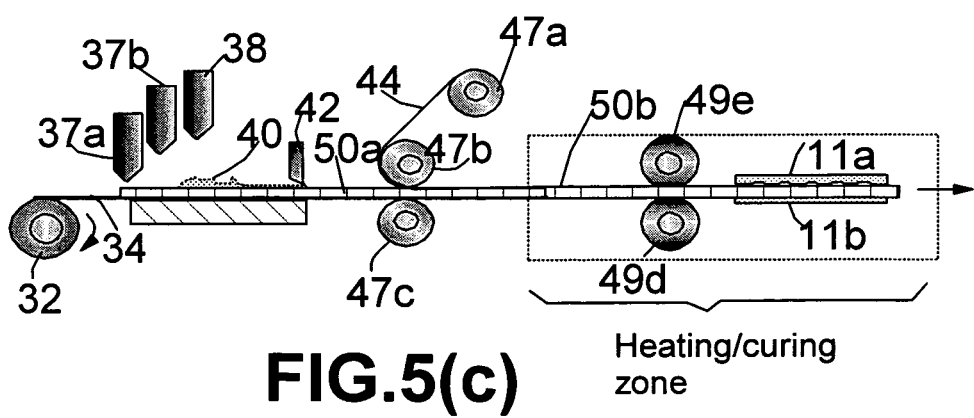
Figure 5D:
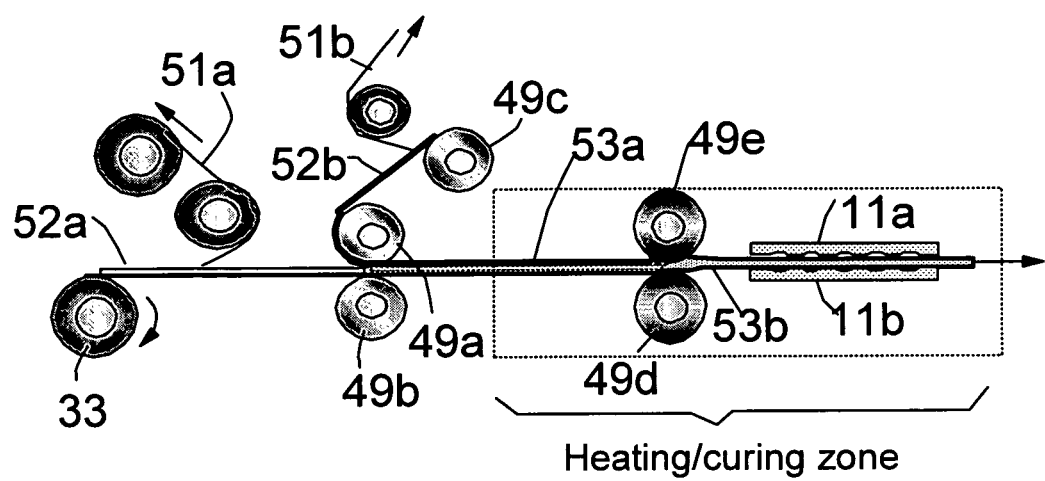

Another preferred embodiment of the present invention is a bipolar plate as schematically shown in FIG. 4(d), which may be made from a precursor three-layer structure schematically shown in FIG. 4(c). The three-layer precursor structure is composed of a core conductive filler-resin layer 96 sandwiched between a top layer 98 and a bottom layer 99 of carbon/graphite particles. Again, these particles may be selected from the group consisting of carbon fibers, carbon nano-tubes, graphitic nano-fibers, nano-scaled graphene plates, carbon blacks, graphite powder, amorphous carbon, chemical vapor deposited carbon, laser-induced carbon, and combinations thereof. FIG. 4(d) shows a carbon cladded composite bipolar plate comprising a conductive composite core layer 100 cladded with a top layer and a bottom layer of carbon or graphite material (containing typically 80% to 100% carbon/graphite particles such as carbon nano-tubes, graphitic nano-fibers, nano-scaled graphene plates, carbon black, fine graphite powder, etc.) having flow channels 102 and 104. The very exterior skin portion of both the top layer and the bottom layer may contain essentially 100% particles free from any resin. The portion of the top or bottom layer immediately behind this skin may begin to have an increasing proportion of resin that helps to hold individual particles together. Hence, the sub-skin layer may be essentially a composition-gradient material with a decreasing proportion of conductive particles as we move toward the center of the core layer.

The core composite layer may comprise a matrix material that is a thermoplastic, thermoset, semi-interpenetrating network (semi-IPN, e.g., from thermoplastic polyurethane and epoxy resin), inter-penetrating network (e.g., from thermosetting polyurethane and epoxy resin), rubber or elastomer, or a combination thereof. The thermoset resin can be any resin which, upon exposure to heat or high energy radiation (e.g., electron beam), becomes cured (e.g., forming a cross-linked network). The thermoset resin may be advantageously selected from the group consisting of unsaturated polyester resins, vinyl esters, epoxies, phenolic resins, polyimide resins, bismaleimide resins, polyurethane resins, and combinations thereof. It may be noted that the composite layer composition in the present invention does not need (nor does it have) a resin binder to hold the reinforcement particles together in the core composite layer, as opposed to the conductive composites disclosed in our earlier application [U.S. patent application Ser. No. 11/324,370 (Jan. 4, 2006)]. All we need in the present composite layer is a matrix resin and a conductive filler phase dispersed in the matrix. Further, the conductive composites disclosed in this earlier application is essentially limited to a thermoplastic matrix and a high filler proportion (>50%) only.

The conductive filler in the composite layer may be selected from small-sized particles (preferably smaller than 10 μm and more preferably smaller than 1 μm) such as a carbon black, graphite particle, nano-scaled graphene plate, graphitic nano-fiber, metal particle, or a combination thereof. When a thicker filler-resin mixture layer (also herein referred to as the core composite layer) is allowed or desired, carbon or graphite fibers (fiber diameter typically greater than 12 μm) may also be used, alone or in conjunction with the aforementioned small-sized particles. Although not necessarily preferred, a quantity of other types of reinforcement fiber, such as glass fiber or polymer fiber, may be added to impart additional structural integrity to the resin mixture layer.

The type and proportion of the conductive filler in the core composite layer are preferably chosen in such a way that the bulk conductivity of the resulting resin mixture is greater than 1 S/cm, further preferably greater than 10 S/cm, and most preferably greater than 100 S/cm. However, these conductivity values should not be construed as limiting the scope of the invention. If the bipolar plate is thin enough, a lower-conductivity composite layer (e.g., <1 S/cm) will still be fine. Typically, when the conductive filler proportion in the filler-resin mixture is between 3% and 20% by weight (based on the total weight of the filler-resin mixture or composite), the bulk conductivity of the filler-resin mixture exceeds 10 S/cm, up to approximately 35 S/cm, depending on the filler type. When the proportion is between approximately 20% and 45%, the filler-resin conductivity exceeds 50 S/cm. When the proportion is greater than 45%, the filler-resin conductivity exceeds 100 S/cm. This has led to cladded composite plates having an overall conductivity mostly greater than 100 S/cm, exceeding the US Department of Energy conductivity target for composite bipolar plates.

In one embodiment of the present invention, the top layer is a carbon or graphite material clad, but the bottom layer can be an electrically conductive film or foil, such as a carbon paper, carbon or graphite fabric, conductive polymer film, or metal foil. This will also make a good bipolar plate. In another preferred embodiment, both the top and bottom sheets can be selected from a carbon paper, carbon/graphite fabric, or carbon/graphite fiber-containing sheet. In these cases, a portion of the thermoset resin in the filler-resin mixture of the core layer can permeate into the top or bottom layer to further enhance the structural integrity of the resulting laminate.

The overall conductivity of a two-layer flow field plate or a three-layer bipolar plate also depends upon the relative thickness of the filler-resin matrix or core composite layer with respect to the total thickness of the clad layers. Since the carbon/graphite clad is highly conductive (typically with a conductivity greater than 300 S/cm) and the core composite layer is typically lower than the clad layer in conductivity, the core composite layer should be made as thin as possible to achieve a maximum electronic conductivity. This requirement is not essential if the bipolar plate is sufficiently thin so that the areal conductivity exceeds 200 S/cm$^2$. However, a certain minimum core layer thickness may be desired to obtain a desired level of mechanical stiffness or strength of the bipolar plate.

If the core composite layer conductivity is higher (e.g., 100 S/cm), any ratio of core layer thickness-to-total clad thickness can be used in order to achieve a bipolar plate conductivity of 100 S/cm or higher since the carbon/graphite clad typically has a conductivity from 300 S/cm to as high as $10^5$ S/cm. In this case, the composite core layer can be much thicker than a clad layer. In a preferred situation, where each clad layer is approximately 10 μm thick (with a conductivity of $10^3$ S/cm) and the composite core layer is 100 μm, a bipolar plate areal conductivity as high as 2000 S/cm$^2$ can be achieved if the core layer conductivity is greater than 20 S/cm. An areal conductivity greater than 200 S/cm$^2$ can be readily obtained if the core layer conductivity is greater than 2 S/cm. A core layer conductivity of 1 S/cm will lead to a plate areal conductivity of approximately 100 S/cm$^2$.

As indicated earlier, the conducting filler material may be selected from carbon fibers, metal fibers, metal particles (preferably nano-scaled), carbon nano-tubes (CNTs), graphitic nano-fibers (GNFs), nano-scaled graphene plates (NGPs), carbon blacks (CB), or a combination thereof. Individual nano-scaled graphite planes (individual graphene sheets) and stacks of multiple nano-scaled graphene sheets are collectively called nano-sized graphene plates (NGPs). The structures of these materials may be best visualized by making a longitudinal scission on the single-wall or multi-wall of a nano-tube along its tube axis direction and then flattening up the resulting sheet or plate. These nano materials have strength, stiffness, and electrical conductivity that are comparable to those of carbon nano-tubes, but NGPs can be mass-produced at lower costs. They can be produced by reducing the expanded graphite particles to much smaller sizes (100 nanometers or smaller). NGPs are available from our research facilities. The preparation of other nano-scaled carbon-based materials, including CNTs, GNFs, and carbon black, is well-known in the art. They are all commercially available, along with nano-scaled metal particles. These nano-scaled, electrically conductive filler materials are preferred conductive filler ingredients for use in making the presently invented carbon cladded composite compositions.

It may be further noted that CNTs, GNFs, and NGPs are known to be capable of imparting high strength and stiffness to a resin matrix. They are ideally suited for the present applications.

A preferred process for producing a two-layer or three-layer carbon-cladded composite flow field plate or bipolar plate begins with the preparation of a conductive filler-resin mixture as a precursor to the desired composite layer. Mixing a conductive filler with a resin may be accomplished via using, for instance, a static mixer or extruder, or via a solution mixing technique. Although not a preferred technique, solution mixing may entail dissolving a polymer in a solvent to form a solution and then dispersing conductive particles in this solution to form a suspension. The suspension is then cast into a mold or tool surface, allowing the solvent to be removed (e.g., vaporized) to form a layer of filler-resin mixture. An extruder may be used to mix conductive particles with a polymer (particularly a thermoplastic) to form a mixture melt, which is forced to go through a sheeting die to form a filled thermoplastic sheet or film. A simple static mixer may be employed to produce a mixture, which is then dispensed through a series of nozzles onto a flat substrate surface. A simple roller or doctor's blade is then utilized to regulate the surface height of the mixture to form a layer of a desired thickness.

As shown in FIG. 5($a$), using a thermosetting resin matrix composite as an example, the matrix resin is thoroughly mixed with a conductive filler (such as a mixture of NGP and carbon black) in a static mixer 35 and a combined nozzle/doctor's blade device 37 to form a thin layer 36 of uncured filler-resin composite (basically a paste) that has two sticky, wet surfaces. A non-sticking plastic or paper substrate (protective film 34) is fed continuously or intermittently from a roller 32 to support the paste layer 36, which is also continuously or intermittently supplied from the mixture dispensing devices, 35 and 37. Conductive carbon or graphite particles 40 (e.g., NGP, CB, fine graphite powder, GNF, CNT, etc.) are then uniformly sprayed from a powder-dispensing device 38 over the top primary surface of the wet paste layer 36. A doctor's blade is operated to regulate the height of the powder-coated layer to form a two-layer, uncured structure 50$a$, which may be taken up directly on a winding roller or drum 31 and stored for later use. Alternatively, this un-cured two layer structure 50$a$ may be compressed between two rollers 47$b$ and 47$c$ to further consolidate the sprayed-on particles with the underlying uncured resin-filler composite layer. Another non-sticking thin plastic film or paper 44 may be uncoiled from a source roller 47$a$ that covers the powder-cladded surface to form a multi-layer precursor structure 50$b$ which is collected on the winding drum 31. The doctor's blade 42 and rollers 47$b$, 47$c$ are used to press the conductive particles against the filler-resin paste layer, enabling these particles to partially penetrate into the un-cured resin-filler layer and/or squeezing some resin out of the resin-filler layer to bind with or bond the sprayed-on particles. This operation naturally results in the formation of a two-layer cladded composite precursor structure. This is a fast, roll-to-roll process that can be automated for cost-effective, mass production of precursor structures.

Another preferred method of preparing a carbon-cladded composite precursor structure is schematically shown in FIG. 5($b$). This roll-to-roll process begins with feeding a substrate 34 (e.g., a non-sticking paper or plastic film) from a source roller 32. Dispensing devices (e.g., sprayers 37$a$, 37$b$) are used to dispense a thin layer thermosetting resin (e.g., resin+curing agent), which is followed by operating a dispensing device 38 to spray or deposit a thin layer of conductive filler particles onto the thin thermosetting layer. Another thin layer of thermosetting resin is then sprayed onto the surface of the conductive particle layer. This new resin layer is then coated with another layer of conductive particles. A doctor's blade or roller may be used to consolidate these multi-layer structure. The process may be repeated until a desired filler-resin mixture thickness is obtained. This filler-resin mixture is then coated with a layer of carbon or graphite particles 40 and a doctor's blade 42 is used to produce a carbon-cladded resin-filler composite 50$a$. Again, a protective film or paper 44 may be added and rollers 47$b$, 47$c$ used to obtain paper- or plastic film-wrapped two-layer composite precursor structure 50$b$.

The two-layer precursor cladded composite 50$b$ prepared in FIG. 5($a$) or FIG. 5($b$) may be shaped and cured to form flow field plates via in-line embossing or molding as illustrated in FIG. 5($c$), using the process of FIG. 5($b$) as an example. The precursor structure 52$b$ is continued to be conveyed forward, moving through a heating/curing zone. A pair of rollers 49$d$, 49$e$ may be operated to emboss (impress) flow channels onto the top and/or the bottom surface of the cladded composite. Alternatively, these two rollers may be used simply to help move the precursor forward and provide some heat to advance the cure chemistry, allowing final shaping to be carried out with a pair of matched molds or tools 11$a$, 11$b$. Embossing or matched-mold pressing is carried out before and/or during resin curing to produce the desired flow field channels on the outer surface(s) of the cladded composite. The embossing rollers can be the same rollers used to press the conductive particles against the core resin-filler layer. Similarly, the matched-mold pressing operation can act to impress and consolidate the sprayed-on particles with the resin-filler layer. For a thermoplastic matrix composite, the sprayed-on carbon/graphite particles can be impressed when the thermoplastic is heated to its softening temperature (near its glass transition temperature, if an amorphous polymer, or its melting temperature, if a semi-crystalline polymer). Of course, off-line compression molding or hot pressing may be used to create flow channels on the outer surfaces of the plate while the thermoset resin is being cured and hardened.

Alternatively or preferably, as schematically shown in FIG. 5($d$), two rolls of precursor structures prepared in FIG. 5($a$) or FIG. 5($b$) are mounted on rollers 33 and 49$c$. A two-layer precursor cladded composite 52$a$ is uncoiled from source roller 33 with one of its protective films 51$a$ peeled off to expose the resin-filler layer surface (opposite to the carbon clad layer); e.g., the bottom surface of the cladded composite shown in FIG. 4($a$). Similarly, another two-layer precursor cladded composite 52$b$ is uncoiled from source roller 49$c$ with one of its protective films 51$b$ peeled off to expose the resin-filler layer surface. The two resin-mixture layers are then combined by using two rollers 49$a$, 49$b$ to form a clad-composite-clad structure 53$a$ (possibly still protected by two non-sticking films). Heating means may be used to advance the cure reaction of the thermoset resin (e.g., in a heating zone indicated by a phantom box of FIG. 5($d$)) to achieve a desired degree of curing before the three-layer structure is embossed or matched-die molded between a pair of embossing tools or matting mold platens 11$a$,11$b$ to create the desired flow field channels. These tools or mold platens may also be heated. The two rollers 49$d$, 49$e$ may be heating rollers or embossing rollers. If they are embossing rollers, then it is not necessary to have the matched-mold tools 11$a$, 11$b$. As the laminated sheet (53$a$ or 53$b$) continues to move forward, another portion of the three-layer structure 53$b$ is embossed or molded. This is a continuous process that is suitable for cost-effective mass production of flow field plates or bipolar plates that are highly conductive.

Although not preferred, the top or bottom clay layer may be generated via chemical vapor deposition or laser induced carbon formation after the conductive filler-resin composite is cured.

Figure 6A:
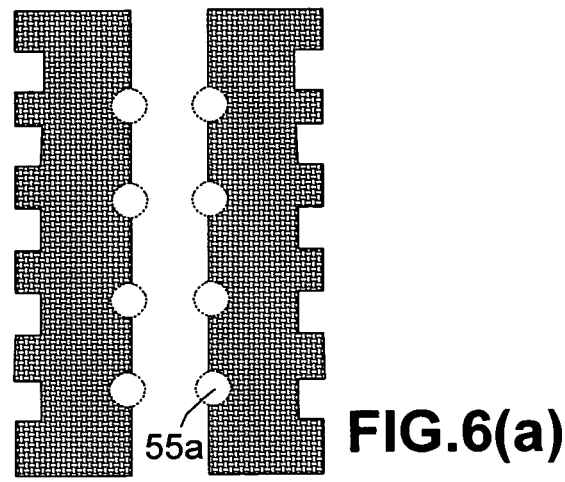
FIG. 6: (a) Schematic of two matting flow field plates each with half of the coolant channels; (b) The two plates, after being molded with the thermoset resin cured, are combined to form a bi-polar plate with coolant channels; (c) Schematic of two matting two-layer precursor laminates (prior to being fully cured) being molded in a matched-mold pressing process with molding pins being used to produce coolant channels; and (d) The resulting integral bipolar plate with built-in coolant channels.
Figure 6B:
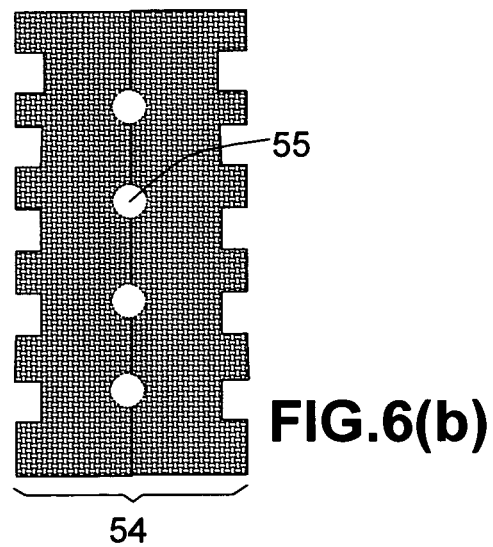
Figure 6C:
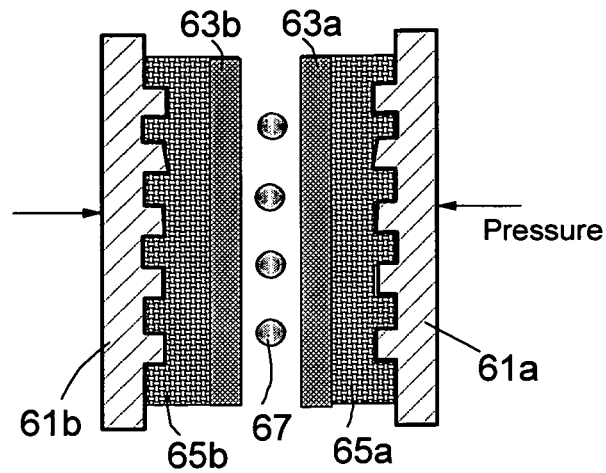
Figure 6D:
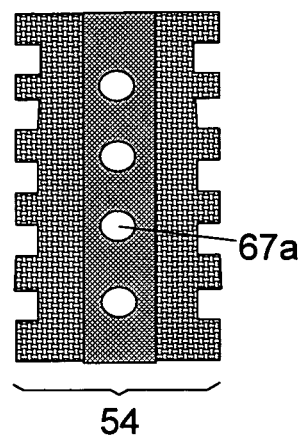
Figure 7:
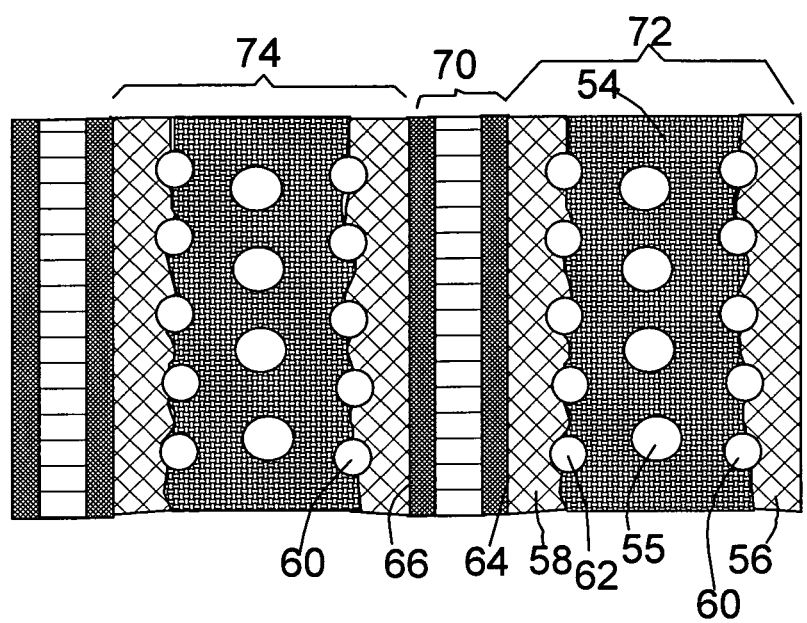
FIG. 7: A sectional view of stacked fuel cells using a series of bipolar plates in accordance with the present invention.

If coolant channels are needed, they can be created during the molding process in several ways. For instance, during the flow field plate molding process, the mold surface may be shaped to produce a part of a channel groove (e.g., 55a in FIG. 6(a)). Two matting flow field plates may then be positioned together to form a bipolar plate 54 (FIG. 6(b)) having coolant channels (e.g., 55). Preferably, coolant channels are built into a bipolar plate when it is molded. For instance, as schematically shown in FIG. 6(c), two uncured or partially cured bi-layer plates (with the plastic film peeled off, leaving behind a resin-filler mixture layer 63a or 63b and graphite clad layer 65a or 65b) may be molded between a pair of matched molds (61a, 61b) and a number of molding pins 67. These pins, coated with a mold release agent, may be pulled out of the cladded composite structure to obtain an integral bipolar plate 54 (FIG. 6(d)) with built-in coolant channels 67a. Optionally, coolant channels may be fitted with connectors, preferably before the resin matrix material is solidified. FIG. 7 shows back-to-back flow field plates that are fabricated as one monolithic component 54, with coolant channels 55 formed as complete channels within the component, as well as reactant channels 60 & 62. The two outer surfaces of bipolar plate 54 are stacked against respective diffuser layers 56,58 (preferably made of carbon paper), which are in turn connected to catalyst-coated membrane (e.g., 70).

The present invention also provides a fuel cell or a stack of fuel cells that comprises a highly conductive flow field plate or bipolar plate component as defined in any of the aforementioned preferred embodiments. The resulting fuel cell system is of lower costs (due to their amenability to mass production) and better performance (due to lower contact resistance and internal resistance and, hence, higher voltage).

Conductivity measurements can be made by using the four-point probe method on small-sized plate samples. Table 1 summarizes the parameters and properties of 12 samples prepared in the present study. The thickness-direction conductivity and areal conductivity of these samples are summarized in FIG. 8(a), FIG. 8(b), FIG. 9(a), and FIG. 9(b), respectively. FIG. 8(a), based on data for Samples 1-7, shows that the core layer resistivity plays a critical role in determining the conductivity of the resulting composite. With the clay layer typically being relatively thin, the thicker core layer must have a relatively high conductivity. A core layer conductivity greater than 100 S/cm (resistivity lower than 0.01 Ohm-cm) is required in order to achieve an overall cladded composite conductivity of 100 S/cm. However, the more critical criterion is the areal conductivity rather than the bulk conductivity of a bipolar plate. FIG. 8(b) shows that the areal conductivity of all of the samples with a core layer thickness of 350 μm (except Sample 1 with a relatively low conductivity) exceeds 200 S/cm$^2$. Since the present technology is capable of fabricating very thin bipolar plates (as thin as 100 μm or thinner being readily producible, if so desired), most of the bipolar plates produced in accordance with the present invention meet the DOE bipolar plate conductivity requirement for vehicular fuel cell applications. FIG. 9(a) and FIG. 9(b) show that clad thickness has a significant effect on the conductivity of the resulting cladded composite. Even though the core layer conductivity is not very high, all samples exceed the areal conductivity requirement.

TABLE 1

Properties of cladded composite bipolar plates.

| Sample No. | Core layer resin mixture composition (Weight %) | Core thickness (cm) | Core layer resistivity (Ω-cm) | Clad thickness (μm) | Clad Resistivity (Ω-cm) |
| --- | --- | --- | --- | --- | --- |
| 1 | 45% Ep, 35% CB, 20% CF | 0.035 | 0.23 | 20 | 0.001 |
| 2 | 40% Ep, 45% CB, 15% NGP | 0.035 | 0.048 | 20 | 0.001 |
| 3 | 40% Ep, 25% Ag, 35% CB | 0.035 | 0.027 | 20 | 0.001 |
| 4 | 35% Ep, 30% GP, 35% GNF | 0.035 | 0.013 | 20 | 0.001 |
| 5 | 35% Ep, 20% GP, 45% GNF | 0.035 | 0.0085 | 20 | 0.001 |
| 6 | 30% Ep, 45% NGP, 20% CF | 0.035 | 0.0067 | 20 | 0.001 |
| 7 | 25% Ep, 55% NGP, 20% CF | 0.035 | 0.0045 | 20 | 0.001 |
| | Clad layer composition | | | | |
| 8 | 65% NGP, 35% GNF | 0.03 | 0.03 | 1 | 0.0005 |
| 9 | 5% VE, 93% GP, 2% CNT | 0.03 | 0.03 | 2.2 | 0.0006 |
| 10 | 15% VE, 65% Ag, 20% GNF | 0.03 | 0.03 | 8.9 | 0.0021 |
| 11 | 15% VE, 65% GP, 20% NGP | 0.03 | 0.03 | 13 | 0.0032 |
| 12 | 15% VE, 65% CF, 20% GP | 0.03 | 0.03 | 87 | 0.0029 |

Note:
For Samples 1-7, clad layer composition = 50% NGP + 50% GNF; For Samples 8-12, the core layer composition = 40% Ep + 30% GP + 30% GNF; Ep = epoxy, VE = vinyl ester resin as a binder, GP = fine graphite particles, NGP = nano graphene plate, CB = carbon black, CF = carbon fiber, GNF = graphitic nano-fiber, Ag = silver nano particles, CNT = carbon nano-tubes.

In summary, the results show that the core layer (resin-filler mixture) composition (hence, its conductivity) and core layer and clad layer thicknesses have a profound influence on the conductivity of the resulting cladded composite bipolar plates. The thinner the core layer (or the thicker the clad layer), the higher the plate conductivity. This is due to the fact that all the clad materials used herein are highly conductive carbon- or graphite-based materials. Most of the samples exhibit very impressive electronic conductivity, particularly the areal conductivity. The process involved is fast, cost effective, and amenable to automation for mass production.

What is claimed is:

1. A carbon-cladded composite fuel cell flow field plate or bipolar plate, said plate consisting of a first clad coated on or bonded to a first surface of a conductive composite layer, and a second clad coated on or bonded to a second surface of said conductive composite layer, wherein said first clad, composite layer, and second clad together form a three-layer sandwich structure and wherein (a) said first clad or said second clad consists of conductive particles of nano-scaled graphene platelets that are substantially non-parallel to said first surface or said second surface of said composite layer such that the basal plane of said platelets are substantially non-parallel to said first surface or said second surface of said composite layer, wherein said first clad or said second clad has an exterior skin that contains 100% of the nano-scaled graphene platelet particles free from any resin;
(b) said conductive composite layer comprises a matrix resin and a conductive filler present in a sufficient quantity to render said composite layer electrically conductive with an electrical conductivity no less than 1 S/cm, wherein said matrix resin is selected from a thermoset resin, a semi-interpenetrating network, an interpenetrating network, a rubber, or a combination thereof and said first clad is bonded to said composite layer to eliminate a resin-rich layer from said first surface and said second clad is bonded to said composite layer to eliminate a resin-rich layer from said second surface; and
(c) said carbon-cladded composite has a planar outer surface, on said first clad or said second clad side, having formed therein a fluid flow channel.

2. The carbon-cladded composite flow field plate or bipolar plate as defined in claim 1, wherein said matrix resin comprises a thermoset resin selected from the group consisting of unsaturated polyester resin, vinyl ester, epoxy, phenolic resin, polyimide resin, bismaleimide resin, polyurethane resin, and combinations thereof.

3. The carbon-cladded composite flow field plate or bipolar plate as defined in claim 1, wherein said conductive filler comprises a conductive material selected from carbon fiber, metal fiber, carbon nano-tube, graphitic nano-fiber, carbon black, metal particle, graphite powder, or a combination thereof.

4. The carbon-cladded composite flow field plate or bipolar plate as defined in claim 1, wherein said first clad or second clad has a thickness smaller than 100 μm.

5. The carbon-cladded composite flow field plate or bipolar plate as defined in claim 1, wherein said first clad or second clad has a thickness smaller than 10 μm.

6. The carbon-cladded composite flow field plate or bipolar plate as defined in claim 1, wherein said first clad or second clad has a thickness smaller than 1 μm.

7. The carbon-cladded composite flow field plate or bipolar plate as defined in claim 1, wherein said composite layer has a thickness smaller than 100 μm.

8. The carbon-cladded composite flow field plate or bipolar plate as defined in claim 1, wherein said three-layer sandwich structure has an electrical conductivity no less than 100 S/cm.

9. The carbon-cladded composite flow field plate or bipolar plate as defined in claim 1, wherein said three-layer sandwich structure has an areal conductivity no less than 200 S/cm$^2$.

10. The carbon-cladded composite flow field plate or bipolar plate as defined in claim 1, further comprising a coolant channel.

11. A fuel cell comprising a flow field plate as defined in claim 1.

12. A fuel cell stack comprising a plurality of fuel cell units separated by at least a bipolar plate as defined in claim 1.

* * * * *